United States Patent [19]

Fukasawa et al.

[11] 4,407,756

[45] Oct. 4, 1983

[54] PROCESS FOR PRODUCING AMINOANTHRAQUINONE

[75] Inventors: Akira Fukasawa, Toyonaka; Masakatsu Yoshimura, Sakai; Tatsuo Kaneoya, Minoo; Kenji Takahashi, Niihama, all of Japan

[73] Assignee: Sumitomo Chemical Company, Limited, Osaka, Japan

[21] Appl. No.: 39,606

[22] Filed: May 16, 1979

[30] Foreign Application Priority Data

May 26, 1978 [JP] Japan .................................. 53-63543

[51] Int. Cl.³ .............................................. C07C 97/24
[52] U.S. Cl. .................................................... 260/378
[58] Field of Search ......................................... 260/378

[56] References Cited

U.S. PATENT DOCUMENTS 3,907,838  9/1975  Thiem et al. ...................... 260/378
3,984,425  10/1976  Mori et al. ......................... 260/378
4,045,454  8/1977  Yamada et al. ................... 260/378

OTHER PUBLICATIONS

Lauth, Bullentin de la Societe Chemique d France, Serie 3, vol. 29, p. 1132, #243, 1903.
A Study of 1-Hydroxylamino-Anthraquinone & Some of Its Derivatives, 6/8/22, p. 2304, Princeton Univ. by Walter H. Beisler & Laudel W. Jones.
The Chemical Age, (Dyestuffs Monthly Supplement), Oct. 8, 1927, pp. 29–30.
J. Chem. Soc., 119, 768–777, (1921).
Bull. Soc. Chim. Fr., 29, 1132–1135, (1903).
Ohhalen der Chemie, 166, 147–155.
Berichte, 15, 1786–1794, (1882).
Anthracene and Anthraquinone, 1921, E. de Barry Barnett, pp. 142–143, P. Van Nostrand Co., N.Y.

Primary Examiner—Delbert E. Gantz
Assistant Examiner—Raymond Covington
Attorney, Agent, or Firm—Stevens, Davis, Miller & Mosher

[57] ABSTRACT

A process for producing an aminoanthraquinone, which comprises feeding of a nitroanthraquinone and an alkali sulfide continuously into a reaction zone kept at a temperature of from 80° to 140° C., the alkali sulfide being used in an amount of 1.6 or more times the mole number of the nitro group, and withdrawing the reaction product continuously or intermittently from the reaction zone; and an aminoanthraquinone obtained by the above process which is one of the most important intermediates of anthraquinone dyes.

14 Claims, 4 Drawing Figures

PROCESS FOR PRODUCING AMINOANTHRAQUINONE

This invention relates to a process for producing an aminoanthraquinone from a nitroanthraquinone, particularly 1-aminoanthraquinone from 1-nitroanthraquinone. More specifically, this invention relates to such process featuring reduction of a nitroanthraquinone with an alkali sulfide to obtain a corresponding aminoanthraquinone.

1-Aminoanthraquine, which is one of the important intermediates for the preparation of anthraquinone dyes, has been produced by sulfonating and then aminating anthraquinone. This method, however, involves some serious problems such as a strong toxicity of the mercury compounds used as catalyst and treatment of waste water in addition to its practical disadvantages such as low yield and low conversion.

As a more advantageous method for the synthesis of aminoanthraquinones, attention is being given recently to the so-called nitration route in which anthraquinone is first nitrated and then reduced. This invention concerns an improvement in the reduction step which is involved in such nitration route for the production of aminoanthraquinones.

Various methods are available for reduction of a nitroanthraquinone resulting from nitration of anthraquinone, for example, use of a metal powder such as iron powder in an acid solvent such as sulfuric acid, use of hydrosulfite, hydrazine or glucose, amination with ammonia, catalytic hydrogenation, and use of an alkali sulfide.

However, all of these methods are possessed of economical disadvantages. That is, the conversion of nitro group(s) into amino group(s) occurs together with various side reactions that affect the aminoanthraquinone yield, and moreover there is necessitated large-scale reaction equipment or a great deal of labor for the treatment of waste material.

Among these reduction techniques, the method using an alkali sulfide is widely used, as exemplified below, for the laboratory preparation of aminoanthraquinones by reducing nitroanthraquinones because such method has a relatively small chance of side reactions.

(1) Roemer: Ber., 15, 1786 (1882)
(2) Boettger and Petersen: Ann., 166, 147 (1873)
(3) Lauth: Bull. soc. chim. Fr., 29, 1132 (1903)
(4) Beisler and Jones: J. Am. Chem. Soc., 44, 2304 (1922)
(5) Haworth and Lapworth: J. Chem. Soc., 119, 774 (1921)
(6) The Chemical Age (Dyestuffs Monthly Supplement), 8, 10, 1927.

The follow-up tests by the present inventors revealed, however, that all of these processes are unsatisfactory in yield and also the product therefrom is very bad in filtering characteristics because the produced aminoanthraquinone is in the form of fine needlelike crystals with size of approximately $(3-5\mu) \times (1-2\mu)$. Also, as no desirable performance can be obtained in the production of a dye unless waste water of reduction adhereing to the crystals is sufficiently removed, a great volume of washing water is required for separating and removing waste water of reduction. Further, the viscosity of the reaction mixture increases in the course of reduction of nitroanthraquinones into aminoanthraquinones and hence it is necessary to use a large quantity of water as solvent for the object material from the standpoints of chemical engineering and safety. For these reasons, the above-said methods are not suited for large-scale industrial production of aminoanthraquinones.

The present inventors minutely studied the reduction of nitroanthraquinones to obtain aminoanthraquinones using an alkali sulfide from the industrial standpoint and reached a finding that the desired aminoanthraquinone can be produced with striking industrial advantages when a nitroanthraquinone is subjected to a continuous heating treatment with a particular amount of an alkali sulfide at a temperature within the range of 80° to 140° C.

Thus, the present invention provides a process for producing an aminoanthraquinone by reduction of a nitroanthraquinone, which comprises carrying out the reduction in an aqueous medium while feeding both of a nitroanthraquinone and an alkali sulfide into a reaction zone kept at a temperature of 80° to 140° C., the alkali sulfide being used in an amount of 1.6 or more times the mole number of the nitro group, and the reaction mixture being taken out of one reaction zone.

When 1-nitroanthraquinone is subjected to the process of this invention, there cn be obtained 1-aminoanthraquinone in a yield of 98 to 100% of theoretical. This yield is about 5 to 10% higher than obtainable with other known reduction methods and also 2 to 3% higher than the experimental results of the prior art using an alkali sulfide.

Another advantage of the process of this invention is decrease of the required amount of the solvent for the reaction. As aforesaid, according to the known batchwise reduction methods using an alkali sulfide, it is necessary to use water in an amount of 20 to 100 parts by weight or more per part by weight of nitroanthraquinone because of high viscosity of the reaction mixture, but according to the process of this invention, the amount of water required for the reaction is less than 20 parts by weight.

The most salient effect of the process of this invention is that the object aminoanthraquinone can be obtained in the form of very large crystals as compared with those obtained from other known alkali sulfide reduction methods, resulting in marked improvement of filterability of the product. The crystals obtained according to the process of this invention has an average size of $(10-200\mu) \times (10-50\mu)$ as shown in FIGS. 1 and 2. Obtainment of such large-sized crystals, coupled with the aforesaid effect of lessening the amount of water required for the reaction, leads to a drastically enhanced efficiency of separation between the aminoanthraquinone crystals and waste water of reduction. This brings about approximately 10 times improvement of the filtering performance in addition to other economical advantages such as sizable shortening of the filtering treatment time and miniaturization of the filter.

In carrying out the process of the present invention, both feeding materials, the nitroanthraquinone and the alkali sulfide, are fed into the reaction zone continuously without interruption, or with interruption (i.e. intermittently), and the reaction mixture is taken out of the reaction zone continuously or intermittently when the feeding materials are fed continuously, or intermittently when the feeding materials are fed intermittently.

In the present process, a preferred manner comprises continuous feeding of both materials with continuous or intermittent withdrawal of the reaction mixture, and the most preferred manner comprises continuous feeding of both materials with continuous withdrawal of the reaction mixture.

The feed of the both materials into the reaction zone is carried out favorably separately.

The reduction of the nitroanthraquinone according to the process of the present invention is carried out in an aqueous medium. The amount of water to be used is not more than 20 parts by weight, in general 5 to 20 parts by weight, favorably 8 to 10 parts by weight, per part by weight of the nitroanthraquinone.

In the present invention, the term "nitroanthraquinone" is used to refer to 1-nitroanthraquinone, 2-nitroanthraquinone, 1,5-, 1,8-, 1,6-, 1,7-, 2,6- and 2,7-dinitroanthraquinones and the mixtures thereof, but the most preferred object products of this invention are the mononitrated mixtures containing as principal ingredient 1-nitroanthraquinone obtained by mononitration of anthraquinone and also containing dinitroanthraquinones as impurities, or high-purity 1-nitroanthraquinone obtained by purifying such mixtures.

The nitroanthraquinone may be supplied in the form of dry powder, but usually it is preferably used in the form of an aqueous slurry. It is desirable to increase the slurry concentration of the nitroanthraquinone for maximizing the possible decrease of the solvent requirement, in other words, the decrease of the amount of waste water released from the reduction reaction, but in view of the restrictions due to the operating conditions, such slurry concentration is usually selected to be within the range of 5 to 50% by weight, preferably 10 to 25% by weight, in practicing the process of this invention.

The alkali sulfide used in this invention includes alkali metal salts, alkaline earth metal salts and ammonium salts of hydrogen sulfide, and polysulfides thereof. Examples of such alkali sulfide are lithium sulfide, sodium sulfide, potassium sulfide, beryllium sulfide, magnesium sulfide, calcium sulfide, barium sulfide, ammonium sulfide, sodium hydrosulfide, potassium hydrosulfide, ammonium hydrosulfide, sodium polysulfide, potassium polysulfide and the like. Most preferred among them are sodium sulfide, sodium hydrosulfide and sodium polysulfide.

The alkali sulfide may be used in the form of an anhydrous solid, a solid containing crystal water, an aqueous solution or a mixture thereof, but an aqueous solution is preferred. The alkali sulfide concentration in the aqueous alkali sulfide solution used in this invention is usually 5 to 50% by weight, preferably 10 to 35% by weight. In order to prevent liberation of hydrogen sulfide gas, the temperature of the alkali sulfide solution to be fed is controlled to less than 90° C., preferably less than 50° C., and more preferably less than 35° C.

In the present invention, the mole number of nitro group is determined by the following formula:

(Mole number of nitro group) = (mole number of mononitroanthraquinone) + (mole number of dinitroanthraquinone) × 2

The theoretically required quantity of the alkali sulfide is 1.5 mole per mole number of nitro group, but in the process of this invention, it is important to use an alkali sulfide in excess of such theoretical requirement. Although the presence of an alkali sulfide in large excess gives no particular influence on the reaction, it is usually used in an amount of 1.6 to 6.0 times, preferably 1.75 to 4.0, more preferably 2.0 to 3.0 times the mole number of nitro group for economical reasons.

In the process of this invention, the reaction is carried out at a temperature within the range of 80° to 140° C., preferably 90° to 120° C., more preferably 95° to 105° C. In the case of carrying out the reaction at a temperature above the boiling point of the reaction mixture, it is conducted under pressure.

In the case where feed of the materials and withdrawal of the product are performed continuously, the reaction may be carried out at a relatively low temperature to prolong the average residence time, or the reaction may be carried out at a relatively high temperature to shorten such residence time. It is however recommended to select the average residence time of 5 minutes to 24 hours at the reaction temperature of 80° to 140° C., particularly 10 minutes to 12 hours at 90° to 120° C. and 30 minutes to 3 hours at 95° to 105° C. In this manner, the reaction product may be intermittently taken out of the reaction zone.

In the case where feed of the materials is performed intermittently, it is possible to prolong the continuous feed time of nitroanthraquinone and alkali sulfide by using a relatively low reaction temperature and to shorten such feed time by using a relatively high reaction temperature, but it is essential to select a continuous feed time sufficient to allow substantial completion of the reaction at the point when continuous feed of nitroanthraquinone and alkali sulfide has ended. For instance, it is recommended to select a continuous feed time of 30 minutes to 24 hours, preferably 1 to 24 hours, at the reaction temperature of 80° to 140° C., particularly 1 to 12 hours at the reaction temperature of 90° to 120° C. and 1 to 8 hours at 95° to 105° C.

More concrete and preferred manners of carrying out the present process are explained as follows.

The nitroanthraquinone in an aqueous slurry and the alkali sulfide in an aqueous solution are separately fed into a stirrer-equipped reaction vessel of a bottomwise withdrawal type at a predetermined rate, and when the content in the vessel has reached a setting volume, withdrawal of the reaction mixture from the bottom outlet is started. The withdrawal is performed by using a pump in line with the total feed rate so that no variation of content volume in the vessel will occur. Since the content of the reaction vessel is of a nonuniform system containing insolubles, arrangement should be made such that sufficient mixing and agitation will fully be performed in the vessel. Usually about 2 to 5 times as much time as the average residence time is required till a steady state is reached in the vessel. The reaction mixture drawn out by the pump is separated into an aqueous solution and the insolubles (aminoanthraquinone) by a known means, for example, by filtration.

The process of this invention may be also carried out as follows. The aqueous slurry of the nitroanthraquinone and the aqueous alkali sulfide solution are fed into a stirrer-equipped reaction vessel of a bottomwise withdrawal type at a predetermined rate, and when the content in the vessel has reached a setting volume, feed of the materials is stopped and additional maintaining of temperature is provided. After confirming completion of the reaction, the reaction mixture is drawn out in its entirety from the bottom outlet and separated into an aqueous solution and insolubles by a known means. In this method, particular care has to be taken during the feeding to attain sufficient mixing of the slurry and solution and to keep the reaction mixture temperature within a predetermined range.

The following modified method is also useful for the practice of this invention. A previously obtained reduction reaction mixture is partly fed into the reaction vessel and kept at a predetermined temperature while performing sufficient agitation, and this is followed by feed of the aqueous slurry of the nitroanthraquinone and the aqueous alkali sulfide solution at a predetermined rate. When the content in the vessel has reached a setting volume, feed of material is stopped and additional maintaining of temperature is provided. The reaction mixture is then drawn out in the same way as said above, but the portion of reaction mixture for the next charge is left.

In the foregoing two methods, it is necessary to control the reaction operation such that substantial reaction will be completed while the aqueous slurry of nitroanthraquinone and the alkali sulfide solution are being fed and that the amount of the reaction by additional maintaining of temperature will be limited to an insignificant degree.

In still another recommendable method, a determined quantity of a previously obtained reaction mixture is fed into the reaction vessel and kept at a predetermined temperature, and then the aqueous slurry of the nitroanthraquinone and the aqueous alkali sulfide solution are supplied into said vessel while simultaneously drawing out the reaction mixture from the vessel at the same rate as that of feed of material.

If necessary, the aqueous slurry of the nitroanthraquinone and/or the alkali sulfide solution may be supplied portionwise.

In carrying out the process of this invention, any type of continuous reactor such as tank-type, tubular-type, tower-type, etc., may be used, but because both the material and product are sparingly soluble in water, the tank-type continuous reaction vessel is recommended for its easiness of operation. In such tank-type reactor, usually 1 to 3 continuous multi-staged tanks are used, but in the process of this invention, use of only one tank is sufficient to attain the object.

The reaction mixture in the reaction zone in accordance with the process of this invention may contain an organic solvent or surface active agent. Also, the effect of this invention is not affected by the presence, in the reaction mixture, of inorganic salts such as sodium sulfate, sodium nitrate, etc., produced in the course of preparation of nitroanthraquinone or impurities (such as sodium carbonate) existing in the alkali sulfide used for the reaction.

The advantage of the process of this invention is that it is capable of producing an aminoanthraquinone from a nitroanthraquinone in a higher yield and at higher efficiency than those obtainable with the prior art techniques. Further, the process of this invention can realize not only an increased yield and miniaturization of the apparatus as compared with the conventional reduction methods but also a sizable reduction of waste water discharge and a substantial decrease of drainage load. This is quite desirable from the aspect of prevention of environmental pollution.

The aminoanthraquinones produced according to the process of this invention are also of value as intermediates for the preparation of dyes and pigments.

This invention is now described in further detail by way of the following examples, but this invention is not limited to these examples. In the following descriptions of the Examples, all the parts and percents are by weight unless otherwise specified.

EXAMPLE 1

A slurried mixture of a nitroanthraquinone and water and a 12.0% sodium hydrosulfide aqueous solution were poured simultaneously into a 1,500-volume-part glass-made flask under agitation while maintaining the internal temperature of the vessel at 94°–96° C. The feeding rates of said slurried mixture (nitroanthraquinone concentration in the slurry: 17.27%) and the 12.0% sodium hydrosulfide solution were maintained at 805 part/hr and 722 part/hr, respectively. One hour after start of pouring, draw-out of the reaction mixture from the bottom of the flask was started and the draw-out rate was kept constant at 1527 part/hr. The efflux rate of aminoanthraquinone (as dry cake portion) obtained by filtering and washing the effluent after reaching a steady state in the vessel was 117 part/hr.

The nitroanthraquinone used was composed of 74.3% of 1-nitroanthraquinone, 0.6% of 2-nitroanthraquinone and 22.3% of dinitroanthraquinone, and the 1-aminoanthraquinone content in the obtained aminoanthraquinone (as dry cake portion) was 77.0%.

The yield of 1-aminoanthraquinone as calculated in terms of purity was 99.0% and the amount of water supplied into the vessel was 9.4 times that of the nitroanthraquinone. The obtained aminoanthraquinone mixture had very excellent filterability and a crystal photograph thereof is shown in FIG. 1.

EXAMPLE 2

30 parts of the reaction mixture obtained from the reduction reaction of Example 1 was put into a 50-volume-part stainless steel vessel, and then a nitroanthraquinone-water mixture with slurry concentration of 12.8% and a 20.0% aqueous solution of sodium hydrosulfide were supplied into said vessel at the rates of 21.3 part/hr and 8.7 part/hr, respectively, under agitation while maintaining the temperature within the range of 95°–98° C. Concurrently with this, the reaction mixture was drawn out from the vessel at a rate equal to the total feed rate (30 part/hr) so that the amount of the reaction mixture in the vessel is maintained constant. The efflux rate of the aminoanthraquinone (as dry cake portion) was 2.25 part/hr.

The nitroanthraquinone used was composed of 69.1% of 1-nitroanthraquinone, 0.7% of 2-nitroanthraquinone and 26.8% of dinitroanthraquinone, and the 1-aminoanthraquinone content in the effluent aminoanthraquinone dry cake was 73.6%. The reduction yield from 1-nitroanthraquinone to 1-aminoanthraquinone was 99.7%. The crystals of the aminoanthraquinones obtained in this and following Examples 2–6 are represented by FIG. 2. They had excellent filterability as tested by a rotary vacuum filter or a pressure filter and could be efficiently separated from waste water of reduction.

EXAMPLE 3

30 parts of the reaction mixture obtained from Example 2 was put into a 50-volume-part stainless steel vessel and maintained at a temperature within the range of 95°–98° C. while performing sufficient agitation. Then a nitroanthraquinone-water mixture with slurry concentration of 10.3% and 60%-purity sodium sulfide crystals were supplied into said vessel at the rates of 31.7 part/hr and 4.3 part/hr, respectively, while the reaction mixture was drawn out simultaneously at a rate equal to the total feed rate so that no change of the amount of the reaction mixture in the vessel takes place. The efflux rate of the aminoanthraquinone (as dry cake portion) was 2.68 part/hr.

The 1-nitroanthraquinone content in the nitroanthraquinone dry cake and the 1-aminoanthraquinone content in the aminoanthraquinone dry cake were 70.6% and 74.0%, respectively, and the remainder was mostly dinitro- or diamino-anthraquinone.

The amount of sodium sulfide used was 2.3 times the molar quantity of nitro group, and the 1-aminoanthraquinone yield was 97.6%.

EXAMPLE 4

A 1-nitroanthraquinone (98.0% purity) and water mixture with slurry concentration of 17.2% and a 12.0% aqueous solution of sodium hydrosulfide were added dropwise into a 2,000-volume-part glass-made vessel under agitation while maintaining the internal temperature of the vessel at 94°–96° C. The feeding rates of the 1-nitroanthraquinone-water mixture and the 12.0% sodium hydrosulfide solution were maintained constant at 1,055 part/hr and 945 part/hr, respectively. One hour after start of pouring, withdrawal of the reaction mixture from the bottom of the flask was started, with the efflux rate being maintained constant at 2,000 part/hr. The flow rate of 1-aminoanthraquinone (98.5% purity) in the effluent obtained from the 6th hour and afterward was 158 part/hr.

1-aminoanthraquinone was obtained in the yield of 99.3% based on the starting material 1-nitroanthraquinone, and the crystals of 1-aminoanthraquinone had very excellent filterability.

EXAMPLE 5

A slurried mixture of a nitroanthraquinone and water having dissolved therein sodium sulfate and sodium nitrate (nitroanthraquinone concentration: 5.28%, sodium sulfate and sodium nitrate concentration: 4%, the remainder being water) and a 30.9% sodium hydrosulfide aqueous solution were supplied into a 1,500-volume-part stainless steel vessel under agitation at the rates of 383.3 part/hr, and 41.7 part/hr, respectively, and three hours after start of supply, withdrawal of the reaction mixture was started at a constant rate of 425 part/hr. The reaction temperature was maintained at 97°–98° C. during this operation. The effluent was cooled to 70°–80° C., filtered, washed and dried to obtain an aminoanthraquinone (dry cake). The aminoanthraquinone efflux rate from the 6th hour and afterward after start of withdrawal was 16.8 part/hr.

The nitroanthraquinone used as starting material was composed of 74.9% of mononitroanthraquinone and 23.5% of dinitroanthraquinone, and the 1-aminoanthraquinone content in the obtained aminoanthraquinone (dry cake) was 78.2%. The yield of 1-aminoanthraquinone as calculated in terms of purity was 98.7%.

EXAMPLE 6

The process of Example 1 was repeated by maintaining the temperature in the continuous reaction vessel at 102°–103° C., with the evaporated steam being condensed by a condenser and refluxed into the vessel, and maintaining the 12.0% sodium hydrosulfide feed rate at 580 part/hr and the withdrawal rate at 1,385 part/hr, thereby obtaining an aminoanthraquinone (dry cake) at the rate of 117 part/hr. The 1-aminoanthraquinone content in the obtained aminoanthraquinone (dry cake) was 77.7%, and the yield of 1-aminoanthraquinone as calculated in terms of purity was 99.9%.

EXAMPLE 7

10 parts of the steady effluent of the reaction mixture obtained from the reduction reaction of Example 1 was put into a 60-volume-part stainless steel vessel. The material was given sufficient agitation for mixing and maintained at the temperature of 98°–101° C. Then 18.3 parts of a nitroanthraquinone-water mixture with nitroanthraquinone concentration in slurry of 20% and 26.7 parts of a 10% sodium sulfide aqueous solution were fed into said vessel over the period of 3 hours. The nitroanthraquinone used here was same as that used in Example 1. Thereafter, the mixture was agitated for 30 minutes while maintaining the temperature within said range and, after cooling to 70° C., 45 parts of the reaction mixture was taken out.

The remaining 10 parts of the reaction mixture left in the vessel was subjected to the above-said operation and such operation was repeated to separate average 3.09 parts per operation of an aminoanthraquinone (dry cake) from the reaction mixture.

The 1-aminoanthraquinone content in the obtained aminoanthraquinone (dry cake) averages 76.9%, and the reduction yield from the starting 1-nitroanthraquinone into 1-aminoanthraquinone was 99.2%.

The obtained aminoanthraquinone crystals were substantially the same size as those obtained in Example 2 and had excellent filterability. Referential Example 1 (Method of prior art literature (2))

15 Parts of the nitroanthraquinone (1-nitroanthraquinone content: 74.3%) used in Example 1 was sufficiently pulverized and suspended in 279 parts of water at room temperature. Upon addition thereto of 30.7 parts of a 30.5% sodium hydrosulfide aqueous solution, there was generated a slight amount of heat and the solution color was turned into green. In the course of temperature rise to 95° C. for the period of 30 minutes, the reaction mixture became very viscous but the temperature rise was continued. During additional 4-hour agitation at 95°–98° C., there took place little advancement of the reduction reaction. The reaction mixture was cooled to 70° C., filtered, washed and dried to obtain 12.5 parts of an aminoanthraquinone containing 75.6% of 1-aminoanthraquinone. The obtained aminoanthraquinone crystals had the maximum length of 3–5μ, and a photograph thereof is shown in FIG. 3. The yield of 1-aminoanthraquinone as calculated in terms of purity was 96.2%. The amount of water used for the reaction was 20 times that of the nitroanthraquinone, but since the reaction mixture becomes too viscous in the course of temperature rise, it was difficult to lessen the water amount below such level. Also, the filtering rate was very low because of small size of crystals and there was required about 10 times as much time for filtration as required in Example 1.

REFERENTIAL EXAMPLE 2

(Method of prior art literature (3))

5,500 Parts of water was added to a mixture of 200 parts of the nitroanthraquinone (98.0% 1-nitro content) used in Example 4 and 400 parts of 32% sodium sulfide and the mixed solution was heated from room temperature till boiling by spending 70 minutes. A part of the reaction mixture was sampled out and the heating was continued until substantially no unreacted nitro component became detectable by gas-chromatography. Approximately 3 hours was required for this treatment. Thereafter the reaction mixture was cooled to 70° C., filtered, sufficiently washed and dried to obtain 171 parts of 1-aminoanthraquinone. The purity of 1-aminoanthraquinone as determined by gas-chromatography was 98.1%, and the yield of 1-aminoanthraquinone from 1-nitroanthraquinoen was 97.1%. The thus obtained 1-aminoanthraquinone crystals were the substantially same size as those obtained in Referential Example 1, and because of poor filterability, a great deal of time and labor were required for separating them from waste water of reduction.

REFERENTIAL EXAMPLE 3

(Method of prior art literature (4))

10 parts of the nitroanthraquinone used in Example 1 was made pasty with 23.9 parts of sodium sulfide flakes (60% purity) and 11 parts of water, and this dark green paste was poured into 800 parts of hot water of 95°–98° C. and the remainder was poured by washing with 170 parts of cold water. This was followed by additional 2-hour agitation at 97°–100° C. The reaction mixture was then filtered at 70°–80° C., washed and dried to obtain 8.38 parts of an aminoanthraquinone with purity of 75.0%. The yield of 1-aminoanthraquinone was 96.0%. The aminoanthraquinone crystals mostly had the size of 1 to 2$\mu$ as shown in FIG. 4, but a part of the crystals had size of 5 to 10$\mu$. Filterability of the product was very bad as in the case of Referential Examples 1 and 2.

BRIEF DESCRIPTION OF THE DRAWINGS

FIGS. 1 to 4 are the optical microphotographs of the aminoanthraquinone crystals, wherein FIG. 1 is a microphotograph of the crystals obtained in Example 1, FIG. 2 is that of the crystals obtained in Example 2, FIG. 3 is that of the crystals obtained in Referential Example 1 and FIG. 4 is that of the crystals obtained in Referential Example 3.

Figure 1:
Figure 1:
Figure 2:
Figure 2:
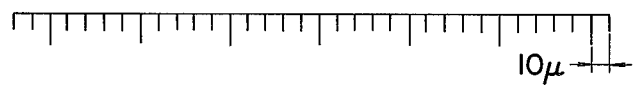
Figure 3:
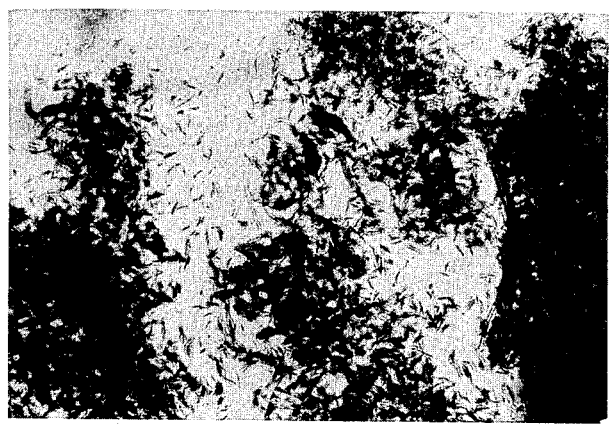
Figure 3:
Figure 4:
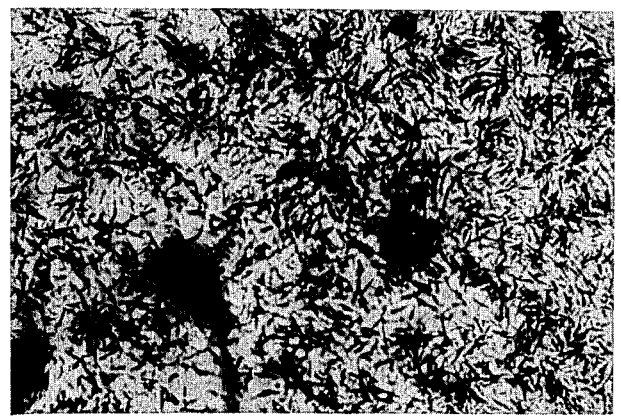
Figure 4:
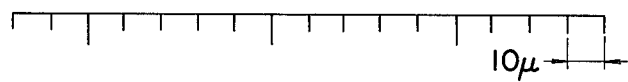

What is claimed is:

1. A process for producing an aminoanthraquinone by reduction of a nitroanthraquinone, whichcomprises carrying out the reduction in an aqueous medium while feeding a nitroanthraquinone and an alkali sulfide into a reaction zone kept at a temperature of from 80° to 140° C., the alkali sulfide being used in an amount of 1.6 or more times the mole number of the nitro group, and while withdrawing the reaction product from the reaction zone.

2. A process according to claim 1, wherein the nitroanthraquinone is fed as an aqueous slurry thereof.

3. A process according to claim 2, wherein the concentration of the nitroanthraquinone in the aqueous slurry is 5 to 50% by weight.

4. A process according to claim 1, wherein the alkali sulfide is an alkali metal, alkaline earth metal or ammonium salt of hydrogen sulfide.

5. A process according to claim 1, wherein the alkali sulfide is fed as an aqueous solution thereof.

6. A process according to claim 5, wherein the concentration of the alkali sulfide in the aqueous solution is 5 to 50% by weight.

7. A process according to claim 1, wherein the alkali sulfide is used in an amount of 2.0 to 3.0 times the mole number of nitro group.

8. A process according to claim 1, wherein the temperature of the reaction zone is from 90° to 120° C.

9. A process according to claim 1, wherein the amount of water is 5 to 20 parts by weight per part by weight of the nitroanthraquinone.

10. A process according to claim 1, wherein the feeding of the nitroanthraquinone and the alkali sulfide is carried out separately.

11. A process according to claim 1, wherein the feeding of the nitroanthraquinone and the alkali sulfide is carried out continuously with continuous or intermittent withdrawl of the reaction product.

12. A process according to claim 1, wherein the feeding of the nitroanthraquinone and the alkali sulfide is carried out continuously with continuous withdrawal of the reaction product.

13. A process according to claim 12, wherein the residence time in the reaction zone is from 5 minutes to 24 hours.

14. A process according to claim 1, wherein the nitroanthraquinone is a mononitrated mixture of an anthraquinone which is principally composed of 1-nitroanthraquinone.

* * * * *